United States Patent
Arora

(10) Patent No.: US 9,019,867 B2
(45) Date of Patent: Apr. 28, 2015

(54) IP BASED EMERGENCY SERVICES SOLUTION IN WIMAX

(75) Inventor: Prince Arora, Reading (GB)

(73) Assignee: NEC Corporation, Tokyo (JP)

(*) Notice: Subject to any disclaimer, the term of this patent is extended or adjusted under 35 U.S.C. 154(b) by 90 days.

(21) Appl. No.: 13/567,374

(22) Filed: Aug. 6, 2012

(65) Prior Publication Data
US 2013/0028145 A1 Jan. 31, 2013

Related U.S. Application Data

(63) Continuation of application No. 12/674,320, filed as application No. PCT/JP2008/064671 on Aug. 12, 2008.

(30) Foreign Application Priority Data

Aug. 20, 2007 (GB) .................................. 0716246.4

(51) Int. Cl.
- H04L 12/16 (2006.01)
- H04W 4/22 (2009.01)
- H04W 76/00 (2009.01)
- H04W 8/26 (2009.01)
- H04W 76/02 (2009.01)
(Continued)

(52) U.S. Cl.
CPC . *H04W 4/22* (2013.01); *H04W 8/26* (2013.01); *H04W 76/007* (2013.01); *H04W 76/02* (2013.01); *H04W 80/04* (2013.01); *H04W 88/04* (2013.01)

(58) Field of Classification Search
USPC ......................................... 370/259; 455/404.1
See application file for complete search history.

(56) References Cited

U.S. PATENT DOCUMENTS

| 7,245,900 B1 | 7/2007 | Lamb et al. |
| 8,116,720 B2 * | 2/2012 | Goldman et al. .......... 455/404.1 |
| 8,165,559 B1 * | 4/2012 | Klesper et al. ............ 455/404.1 |

(Continued)

FOREIGN PATENT DOCUMENTS

| JP | 2005-287033 A | 10/2005 |
| JP | 200680962 A | 3/2006 |

(Continued)

OTHER PUBLICATIONS

Jun Liu et al., "Location management of the emergency caller in IP-based E911 network", Proceedings of the 2004 IEICE General Conference, Communication 2, Mar. 8, 2004, p. 622.

(Continued)

*Primary Examiner* — Kenny Lin
(74) *Attorney, Agent, or Firm* — Sughrue Mion, PLLC

(57) ABSTRACT

The present invention relates to a method and system for providing access to the emergency services over a network, particularly a WiMAX network. The method comprises the steps of identifying when a user device (51) sends a signal to the WiMAX network (52, 53, 54) requesting access to an emergency service; detecting a network address of the nearest emergency service communication device to the user device; relaying a signal (ES-SERV-RSP) via the WiMAX network to the user device containing the network address of the nearest emergency service communication device; and establishing at least one Service Flow between the WiMAX network and the user device to allow data to be exchanged between the user device and the emergency service communication device.

18 Claims, 7 Drawing Sheets

(51) Int. Cl.
*H04W 80/04* (2009.01)
*H04W 88/04* (2009.01)

(56) References Cited

U.S. PATENT DOCUMENTS

| | | | |
|---|---|---|---|
| 2005/0153706 A1 | 7/2005 | Niemenmaa et al. | |
| 2005/0213565 A1 | 9/2005 | Barclay et al. | |
| 2006/0072547 A1 | 4/2006 | Florkey et al. | |
| 2006/0172742 A1 | 8/2006 | Chou et al. | |
| 2006/0252407 A1 | 11/2006 | Goldman et al. | |
| 2007/0060097 A1 | 3/2007 | Edge et al. | |
| 2007/0092070 A1 | 4/2007 | Croy et al. | |
| 2007/0121798 A1 | 5/2007 | Croy et al. | |
| 2007/0153982 A1 | 7/2007 | Bloebaum et al. | |
| 2007/0153983 A1 | 7/2007 | Bloebaum et al. | |
| 2007/0254625 A1* | 11/2007 | Edge | 455/404.1 |
| 2007/0298806 A1* | 12/2007 | Venkatachalam | 455/450 |
| 2008/0031182 A1* | 2/2008 | Maheshwari et al. | 370/320 |
| 2008/0112343 A1 | 5/2008 | Oleszczuk | |
| 2008/0153453 A1* | 6/2008 | Bachmutsky | 455/404.1 |
| 2008/0304487 A1* | 12/2008 | Kotecha | 370/392 |
| 2008/0311881 A1 | 12/2008 | Taaghol et al. | |
| 2009/0147929 A1 | 6/2009 | Zhao | |
| 2009/0264095 A1 | 10/2009 | Khetawat et al. | |
| 2010/0135205 A1 | 6/2010 | Li et al. | |

FOREIGN PATENT DOCUMENTS

| | | |
|---|---|---|
| JP | 2006-101516 A | 4/2006 |
| JP | 2007-518327 A | 7/2007 |
| WO | 2006/073488 A1 | 7/2006 |
| WO | 2006/093692 A2 | 9/2006 |
| WO | 2006121651 A2 | 11/2006 |
| WO | 2007016695 A2 | 2/2007 |
| WO | 2007081563 A2 | 7/2007 |

OTHER PUBLICATIONS

B. Rosen et al., "Framework for Emergency Calling using Internet Multimedia draft-ietf-ecrit-framework-02", Jul. 8, 2007, pp. 1-30.
Office Action issued Mar. 7, 2013 in co-pending U.S. Appl. No. 12/674,320.
Office Action dated May 6, 2014, issued in co-pending U.S. Appl. No. 12/674,320.
Communication dated Jun. 18, 2014 from the Japanese Patent Office in counterpart Japanese application No. 2013-155164.

* cited by examiner

Figure 2

| Parameter Name | Type | Length (in bytes) | Value | Scope |
|---|---|---|---|---|
| Service type | 1 | 1 | Bits #0: Fire<br>Bits #1: Police<br>Bits #2: Medical<br>Bits #3-7: Reserved, shall be set to zero. | ES-SERV-REQ |
| SS management support | 2 | 1 | 0: no secondary management connection.<br>1: secondary management connection. | ES-SERV-REQ/RSP |
| IP Version | 3 | 1 | Bits #0:4 (default)<br>Bits #1: 6<br>Bits #2-7: Reserved, shall be set to zero. | ES-SERV-REQ |
| Secondary Management CID | 4 | 2 | Secondary Management CID | ES-SERV-RSP |
| PSAP IP Address | 5 | 4 to 16 | IP Address | ES-SERV-RSP |

Figure 3

| Message | Direction | Parameters |
|---|---|---|
| ES-Request | BS to ASN-GW, ASN-GW to CSN | Service Type<br>BSID<br>PSAP Address |
| ES-Response | CSN to ASN-GW, ASN-GW to BS | |

Figure 7

| Parameter Name | Type | Length (in bytes) | Value | Scope |
|---|---|---|---|---|
| Emergency Service | 10 | 1 | 0: No Emergency Service<br>1: Yes Emergency Service | DSA-REQ/RSP/ACK,<br>DSC-REQ/RSP/ACK |

IP BASED EMERGENCY SERVICES SOLUTION IN WIMAX

This is a continuation of U.S. application Ser. No. 12/674,320 filed Feb. 19, 2010, which is a national stage application of PCT/JP2008/064671 filed Aug. 12, 2008, which claims the benefit of priority from British Patent Application No. 0716426.1 filed on Aug. 20, 2007 the contents of which are incorporated herein by reference.

BACKGROUND OF THE INVENTION

1. Technical Field

The present invention relates to a system and method for providing access to the emergency services over a network, particularly a WiMAX network.

2. Background Art

WiMAX (Worldwide Interoperability for Microwave Access) is a standard established by the WiMAX Forum for providing wireless data over long distances. It is fast becoming an alternative to providing broadband Internet access over cable or DSL.

Currently, there are two forms of WiMAX, Fixed WiMAX and Mobile WiMAX. Fixed WiMAX is developed based on the IEEE 802.16-2004 (or 802.16d) standard and is optimized for fixed and nomadic applications in Line-of-Sight and Non-Line-of-Sight environments. Mobile WiMAX is based on the IEEE 802.16-2005 (or 802.16e) standard and targeted primarily for portable and mobile applications in a Non-Line-of-Sight environment, although Mobile WiMAX systems also can provide fixed and nomadic access. The IEEE 802.16e standard incorporates additional features necessary for mobile applications such as flexible power management (sleep mode and idle mode), channel bandwidth scalability (SOFDMA), fractional frequency reuse, and better Non-Line-of-Sight performance/indoor penetration.

The WiMAX device at the user end is known as the WiMAX Subscriber Station, WiMAX CPE (Customer Premises Equipment) or WiMAX MS (Mobile Station) and sends/receives data over the WiMAX network. A WiMAX device could, for example, be a PCMCIA card within a laptop, or a receiver box on the user's premises, which then relays data to the user's personal network.

A WiMAX network consists of an Access Service Network (ASN) and Connectivity Service Network (CSN). The WiMAX ASN is the combination of two logical components, the Base Station (BS) and ASN-Gateway, while the WiMAX CSN is a set of network functions that provide IP connectivity services to the WiMAX subscribers, such as connection to the Internet.

The WiMAX standard uses a connection-oriented MAC (Media Access Control) architecture, where all downlink and uplink connections are controlled by the serving Base Station. Before data transmission occurs, the Base Station and the Subscriber Station establish a connection between the two MAC-layer peers. Each connection is identified by a connection identifier (CID), which serves as a temporary address for user data transmissions over the links. To send or receive MAC management messages, the CIDs are used by the user or by the WiMAX network.

The connections are divided into two principle types-management and transport connections. Management connections carry management messages, whilst transport connections carry other traffic such as user data.

In the WiMAX standard there are three management connections, each with their own respective connection identifier. The three management connections are used to exchange control messages between the Base Station and Subscriber Station. They specify the different Quality of Service (QoS) requirements that are needed at the different management levels. The Basic connection is used to transfer short, time-critical MAC and Radio Link Control (RLC) messages. The Primary management connection transfers long and delay tolerant messages related to authentication and connection setup. The Secondary management connection is used to transfer standards-based messages like Dynamic Host Configuration Protocol (DHCP), Trivial File Transfer Protocol (TFTP) and Simple Network Management Protocol (SNMP).

The WiMAX standard also has a feature known as Service Flows. Service Flows are unidirectional flows of data with a particular set of parameters and data structure.

Each Service Flow is identified by Service Flow parameters, one of which is the Service Flow Identifier (SFID).

Currently, in WiMAX technology, there is no provision for a user to contact the emergency services, via a Subscriber Station, over a WiMAX network. The development of frameworks such as IMS for delivering IP multimedia services to end users has allowed the development of communication methods such a VoIP (Voice over IP), that allow users to communicate over networks such as the Internet.

One of the main issues for providing support for contacting the emergency services over a network is the location of the nearest Public Safety Answering Point (PSAP), which is a communication device used by the emergency services. All emergency calls are routed to the PSAP, which is the answering point of all emergency services and coordinates delivery of emergency calls to the proper emergency services such as Dolice, fire, etc.

If a reliable means to contact the emergency services is to be provided it is vital that users can do so via any WiMAX network, whether they are subscribed to the network or not. One problem with such a requirement is that, should a user not be registered with a particular WiMAX network, any attempt to contact the emergency services over the network would result in an authentication failure, as they are not authorized to use the network. This is even more important when dealing with mobile devices using the 802.16e standard, which may move between different networks frequently.

DISCLOSURE OF THE INVENTION

Problems to be Solved by the Invention

We have appreciated that it is possible to provide access to the emergency services using existing WiMAX networks.

We have further appreciated that, when dealing with something as crucial as access to the emergency services, it is necessary to allow users to access the emergency services even if they are not subscribers to a particular WiMAX network. It is also are requirement that once the emergency call has been placed, the connection can be reliably ended.

Means to Solve the Problems

The invention is defined in the claims to which reference should now be made.

An embodiment of the invention described herein provides a system and method for providing access to the emergency services based on WiMAX technology. It makes use of the existing network architecture of WiMAX to provide support for the proposed solution. The invention also provides a solution to emergency service access when the user is not authenticated with the WiMAX network.

In order to provide connection to the emergency services, or a similar service, over a WiMAX network there are several problems that need to be overcome. Firstly, the network address (e.g. IP address) of the nearest emergency service communication 15 device, such as a PSAP, must be discovered so that the emergency communication can be routed there. Advantageously, the service should be available to anyone capable of accessing the WiMAX network, i.e. anyone with a Subscriber Station, but it is important to note that not everyone will be registered with the WiMAX network. Also, a further advantageous feature would be to cancel connectivity after the emergency communication if the user is not registered with the WiMAX network.

The Invention provides the means to discover the IP address of the PSAP, to establish an emergency session between the Subscriber Station and the PSAP and to subsequently modify or delete an emergency Service Flow, this being a connection between the PSAP and the WiMAX device.

When the WiMAX CPE/SS/MS detects an emergency call, it enquires the PSAP IP address from the WiMAX network. The WiMAX CPE/SS/MS sends a request identified as an emergency service type request to the WiMAX network, over a management connection, to detect the nearest PSAP address. The WiMAX access network routes the request to the WiMAX CSN, which discovers the IP address of the nearest PSAP. The WiMAX CSN sends the response, consisting of the PSAP IP address, to the WiMAX CPE/SS/MS via the WiMAX ASN.

In the case of authentication failure, when a user triggers an emergency service communication, the Subscriber Station requests the WiMAX network to begin an Emergency Session on a Management Connection Identifier. The WiMAX network assigns a CID to the user to provide IP connectivity, as well as the IP address of the nearest PSAP. The WiMAX user first establishes IP connectivity with the WiMAX network on a Secondary Management Connection.

The WiMAX CPE/SS/MS then creates a Service Flow with an Emergency Session 10 indication to exchange information with the PSAP. In the case of authentication failure, on deleting the emergency Service Flow, the WiMAX CPE/SS/MS releases the IP connectivity and the WiMAX Base Station releases the CID. The creation/modification/deletion of a Service Flow to establish or cancel an Emergency Session between the WiMAX CPE/SS/MS and the WiMAX network has previously 15 required authentication of the subscriber, since the WiMAX standard includes methods for preventing unauthorized access. Security is handled by a privacy sublayer within the WiMAX MAC. WiMAX terminal devices are typically assigned a public key and MAC address. WiMAX operators can use these for device authentication, in addition to using a username and password or smart card.

The Emergency Session uses a new Service Flow parameter while creating an emergency Service Flow. When the Service Flow parameter is set to "Emergency Service" it indicates the association of the Emergency Session with the Service flow. The invention also provides for the deletion of an emergency Service Flow and the 25 release of IP connectivity in the case of authentication failure, once an emergency communication is complete.

BRIEF DESCRIPTION OF THE FIGURES

FIG. 2 shows a table detailing an example of the parameters of MAC management messages used in accordance with the invention.

FIG. 3 shows a table detailing an example of the parameters of the ES-Requestand ES-Resoonse Messages used in an embodiment of the invention.

FIG. 7 shows a table giving the details of a service flow parameter.

BEST MODE FOR CARRYING OUT OF THE INVENTION

In order to provide reliable access to the emergency services over a network such as WiMAX the user's device must first be able to discover the IP address of the 25 PSAP. When using a mobile device, the user is roaming from one network to another and the IP address of the nearest PSAP is dependent upon the user location. The PSAP could be located on the same WiMAX network as the user device, or in any other IP based network. The IP address of the nearest PSAP must be discovered in order to route the emergency call to it.

In an embodiment of the invention an Emergency Service Module is introduced into the WiMAX Connectivity Service Network (CSN), which is responsible for detecting the IP address of the nearest PSAP. Furthermore, new MAC management messages are introduced to provide connectivity to the emergency services. A MAC management message is sent by the user to the WiMAX network when the user attempts to contact an emergency service. After receiving the message, or a message dependent thereon, the Emergency Service Module detects the IP address of the nearest PSAP and sends it back to the WiMAX user on another MAC management message.

In the case of authentication failure, where the user is not authorised to access a network, the user is not allowed to use any services provided by the network. In this instance, in accordance with the WiMAX standard, only Basic and Primary Connection Identifiers (CID) are allocated to the WiMAX CPE/SS/MS. Secondary connections are not allocated and, consequently, no IP address is assigned to the WiMAX CPE/SS/MS. The IP address of the PSAP is also unknown to the user. In order to route an emergency call the PSAP IP address must be discovered and the 15 Subscriber Station must also be provided with IP connectivity and requires its own IP address. Ordinarily, an unregistered Subscriber Station would not be provided with an IP address. In an embodiment of the current invention this is achieved by instigating an Emergency Session.

Figure 1:
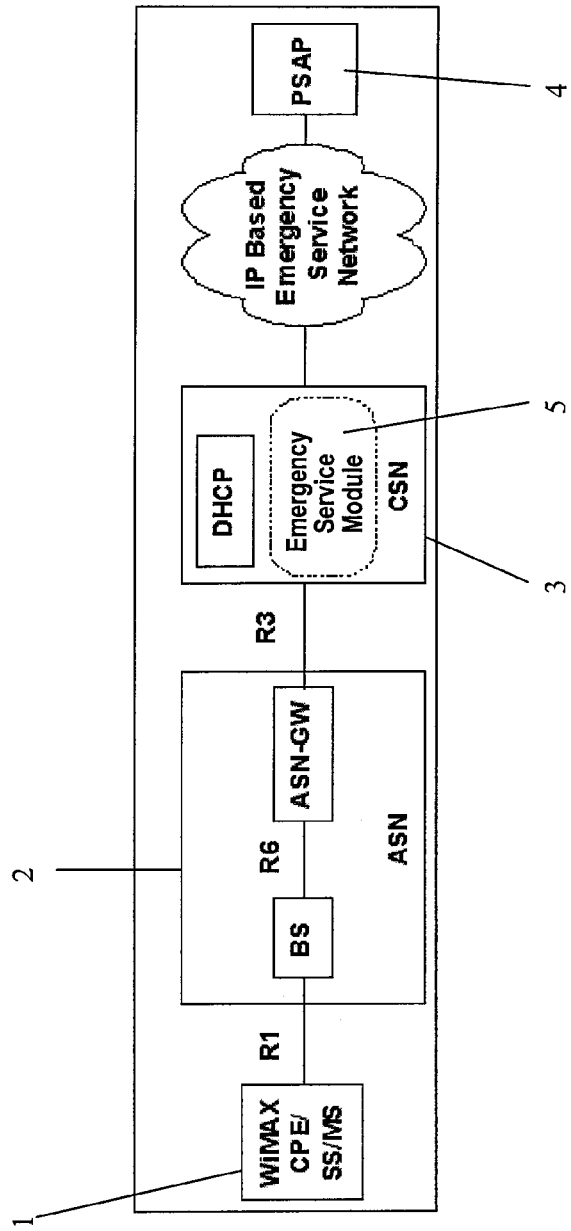
FIG. 1 shows the network components required to implement an embodiment of the invention.

With reference to FIG. 1, when the WiMAX CPE/SS/MS (1) detects an emergency call, it enquires the PSAP IP address from the WiMAX network (2). The WiMAX CPE/SS/MS sends a request identified as an Emergency Session type to the WiMAX ASM to detect the nearest PSAP (4) address. The WiMAX ASN routes the request to the WiMAX CSN (3), and the WiMAX CSN discovers the IP address of the nearest PSAP (which is connected to the WiMAX network through an IP based network). The WiMAX CSN then sends the response, which consists of the PSAP IP address, to the WiMAX CPE/SS/MS via the WiMAX ASN. In the WiMAX network, R1 is the 802.16 (d or e) standard based interface, while R6 and R3 are both IP based interfaces.

In the case of authentication failure, only the Basic and Primary management CIDs are allocated to the WiMAX CPE/SS/MS. There is no initial IP connectivity to the IP network. The WiMAX subscriber then sends a request to the WiMAX network for an emergency session over the connection defined by the Basic CID. The WiMAX network provides a Secondary management CID to provide IP connectivity to the WiMAX subscriber, and also passes the IP address of the PSAP to the WiMAX CPE/SS/MS. The WiMAX CPE/SS/MS establishes IP connectivity on the connection identified by the Secondary management CID and the CSN assigns an IP address to the user using Dynamic Host Configuration Protocol (DHCP).

The Basic connection, identified by the Basic CID, is used to exchange short, time urgent MAC management messages. The Primary management connection, identified by the Primary management CID, is used to exchange longer more delay tolerant MAC management messages. The Secondary management connection, identified by the Secondary CID, is used to transport standard based (DHCP etc) messages. Since in an emergency service call time plays crucial factor, it is preferred to use the connection defined by the Basic CID to transport emergency service MAC management messages, although it would be possible to use the Primary connection.

The WiMAX CPE/SS/MS creates an emergency Service Flow to exchange information with the PSAP. The emergency session is preferably indicated by the 20 additional "Emergency Service" service flow parameter. In the case of authentication failure, on deleting the emergency service flow (i.e. upon completion of communication with the emergency services), the WiMAX CPE/SS/MS releases IP connectivity and the WiMAX Base Station releases the connection identified by the Secondary management CID.

Detection of the nearest PSAP IP address is handled by the Emergency Service Module (5), which is located in the CSN. The Emergency Service Module is a logical function, similar to the Quality of Service protocols, and handles the emergency service requests coming from the subscriber (or non-subscriber as the 30 case may be). The Emergency Service Module is responsible for detecting the nearest PSAP IP address and sending it back to the subscriber.

The preferred embodiment of the invention requires two new MAC management messages, labelled ES-SERV-REQ and ES-SERV-RSP. These messages are exchanged between the WiMAX CPE/SS/MS and the WiMAX BS, this is also known as an exchange at the air interface. MAC management messages are essentially control messages. To define a MAC management message the message type is required, along with the connection over which they can be transferred (e.g. Basic or Primary). An example of the parameters of these messages, when implemented in WiMAX, is shown in the table of FIG. 2. These MAC management messages contain a header, consisting of the CID and other header information, and other information such as that shown in FIG. 2 (Service type, IP version etc).

Corresponding to ES-SERV-REQ/RSP at the air interface, two further messages, ES-Request and ES-Response, are used in both the WiMAX network and IP network side. These messages are exchanged within the WiMAX network, between 15 the Base Station and the ASN-Gate Way, and also between the WiMAX network and an IP based network, between the ASN-Gate Way and the Connectivity Service Network. An example of the parameters of the ES-Request and ES-Response Messages are shown in FIG. 3. The ES-Request and ES-Response messages are defined at the WiMAX network side. The control messages at the WiMAX network side are distinguished by the function type and message type. The function type explains the functionality, examples being "Handover" or "Emergency", etc. The message type defines whether the message is an ES-Request or ES-Response type message.

Figure 4:
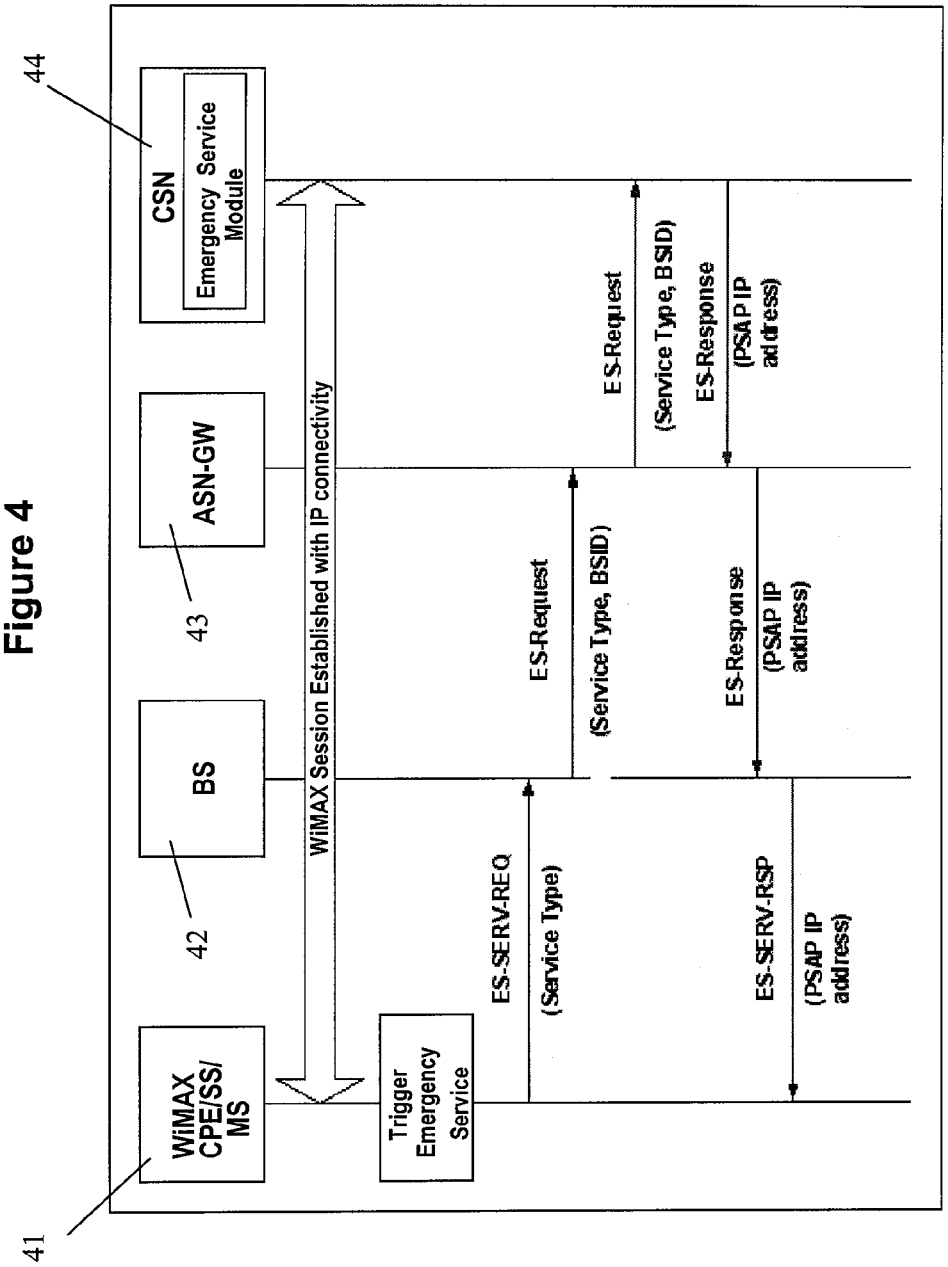
FIG. 4 details the steps taken to discover the IP address of a PSAP when the user is authorised to access the network.

With reference to FIG. 4, the first step after detecting that an Emergency Service request has been triggered is to discover the IP address of the PSAP. If the WiMAX user is registered with the WiMAX network (and, therefore, also has an IP address) then, when the WiMAX CPE/SS/MS (41) detects Emergency Service has been triggered by the user, the user sends message ES-SERV-REQ over the connection 30 identified by the Basic CID towards the Base Station (42), indicating that the request is of an Emergency Service type. The Base Station then sends the ES-Request message, which includes the Base Station ID, to the Connectivity Service Network (44) via the ASN-GW (43) to detect the nearest PSAP IP address. The CSN (44) discovers the IP address of the nearest PSAP and sends it back to the ASN-GW (43) in the ES-Response message. The Base Station then sends the ES-SERV-RSP message containing the PSAP IP address to the WiMAX CPE/SS/MS.

Figure 5:
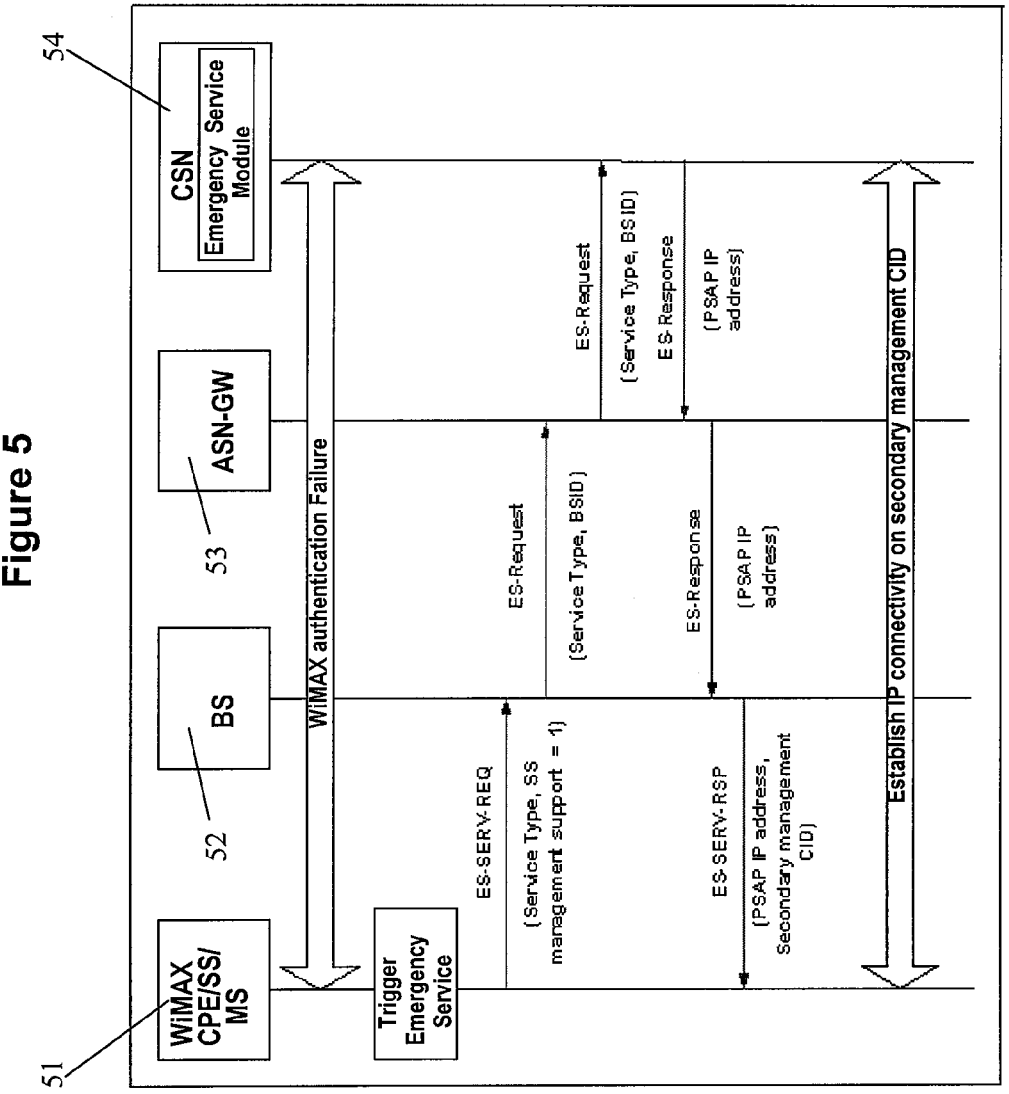
FIG. 5 details the steps taken to discover the IP address of a PSAP when the user is not authorised to access the network.

With reference to FIG. 5, if the WiMAX user is not registered with the WiMAX network then an IP address will not initially be assigned to the WiMAX CPE/SS/MS (51). In this situation, only Basic and Primary CIDs are allocated to the WiMAX CPE/SS/MS. When an emergency service connection is detected at the user end, the WIMAX CPE/SS/MS sends the message ES-SERV-REQ to the Base Station (52) on the connection identified by the Basic CID. The ES-SERV-REQ management message contains Service type and Subscriber Station management support to request for the Secondary Management CID. As with the authorised user, the WiMAX Base Station sends the ES-Request message to the CSN (54) via the ASN-GW (53) with Base Station ID to detect the nearest PSAP IP address. The CSN discovers the IP address of the nearest PSAP and sends it back to the ASN-GW in the ES-Response message. The Base Station then allocates a Secondary Management CID and sends it along with the PSAP IP address in the ES-SERV-RSP message to the WiMAX CPE/SS/MS. In this way, the WiMAX CPE/SS/MS establishes IP connectivity on a connection identified by the Secondary Management CID. Establishing IP connectivity means that an IP address has been allocated to the WiMAX SS device. When using the Secondary Management CID to establish IP connectivity, the IP address is allocated using DHCP procedure.

Figure 6:
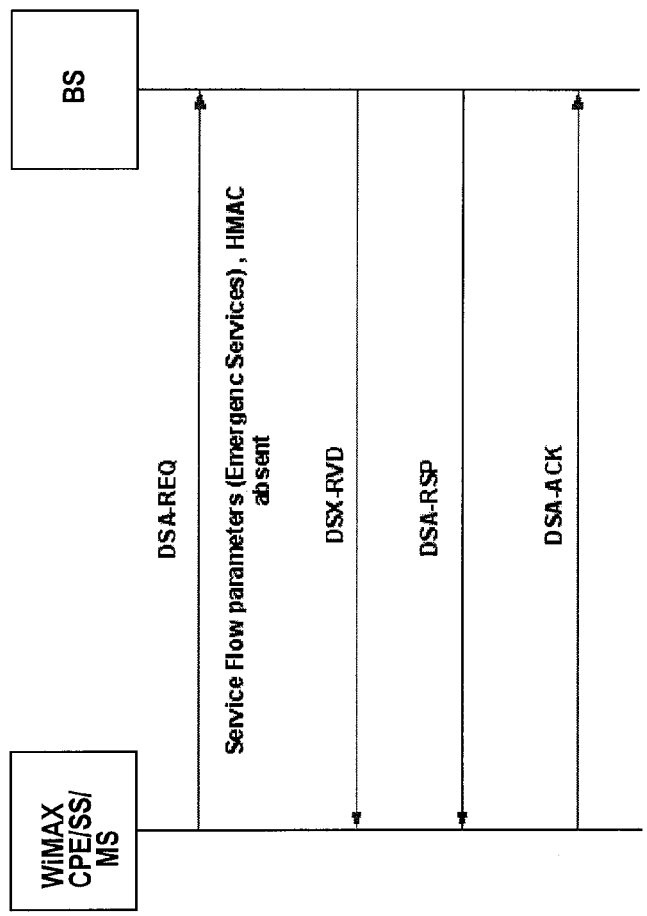
FIG. 6 shows how the WiMAX CPE/SS/MS can create an emergency service flow context.

Once the PSAP IP address and the WiMAX CPE/SS/MS IP address, if required, have been discovered, the WiMAX CPE/SS/MS must create an emergency service flow context such that the service flow can reach the PSAP. FIG. 6 shows how this can be achieved. In the first step, DSA-REQ, the WiMAX CPE/SS/MS requests to establish a service flow context to transfer emergency call data. The DSX-RVD message is sent by the BS to inform the WiMAX CPE/SS/MS that the BS has received DSA-REQ message. The BS then responds with DSA-RSP. The SS completes the transaction with the DSA-ACK message. Creation, change, or deletion of Service Flows is accomplished through a series of MAC management messages. Dynamic Service Addition (DSA) is used for creating a new service flow, Dynamic Service Change (DSC) is used for changing an existing flow, and Dynamic Service Deletion (DSD) is used for deleting an existing service flow.

A DSA request (DSA-REQ) could be initiated either by the Base Station or the Subscriber Station. The DSA-REQ from the Subscriber Station to the Base Station contains a Service Flow reference and parameter set. The Base Station responds with a DSA-RSP and will either accept or reject the request. If accepted, the DSA-RSP message will include a Transport CID whether the user is authenticated or not. The connection identified by the Transport CID is used to transfer voice or data packets. A DSA-REQ from the Base Station contains a Service Flow ID for either one uplink or one downlink Service Flow. Advantageously the Service parameter set contains an associated CID. FIG. 6 shows a Service Flow initiation request by the Subscriber Station.

Since a Service Flow is a unidirectional flow of data, it is preferred that an additional Service Flow is created such that data can be exchanged between the user SS and the Base Station, and therefore between the user SS and the PSAP. The additional Service Flow is set up as described above.

In the preferred embodiment, an emergency Service Flow is provided by introducing a new Service Flow parameter to the Service Flow parameter list. The preferred way of providing the Service Flow parameter is by using the reserved Service Flow parameter type 10, the details of which are shown in the table of FIG. 7. The Service Flow parameter indicates whether the Service Flow context is associated with the emergency service or not. It is also preferred that any authentication function is absent from the Service Flow parameter, to avoid authentication in the case of creation as well as modification of the emergency Service Flow. In a WiMAX network a Hash Message Authentication Code (HMAC) is used for message authentication. The HMAC tuple contains a keyed message to authenticate the sender. Since in case of authentication failure, the subscriber is not authenticated with the network, the HMAC is left out of the message.

Figure 8:
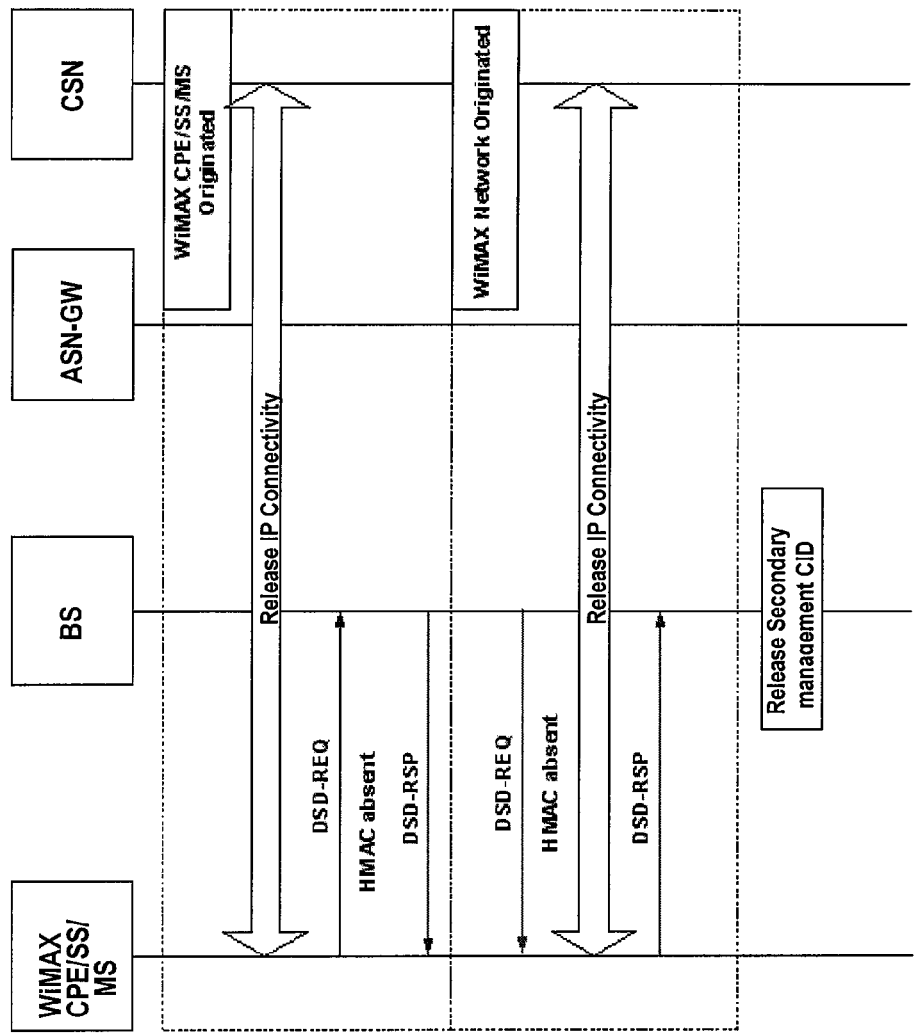
FIG. 8 show the steps required to remove the Emergency Service Flow.

Once communication with the emergency services has ended, the emergency Service Flow must be removed. There are two possible scenarios:

1) If the user is not authenticated with the WiMAX network, then IP connectivity as well as Secondary management CID must be released while deleting the emergency Service Flow context. This prevents a user from continuing to access the network even though the emergency communication has been terminated. Either the Subscriber Station or the network can delete the Service Flow to terminate the emergency service call. According to FIG. 8, when the WiMAX CPE/SS/MS detects that the emergency Service Flow is no longer needed, the WiMAX CPE/SS/MS releases the IP connectivity first and then deletes the emergency Service Flow context. If the WiMAX network initiates deletion of the emergency Service Flow then, after receiving the deletion request, the WiMAX CPE/SS/MS releases IP connectivity. After deletion of the emergency Service Flow context, the Base Station releases the Secondary management CID.

2) In the case of an authentic user, who is registered with the WiMAX network, then emergency Service Flow is deleted in the same manner as specified above, but with the HMAC tuple absent in the message and without the need to release a 20 Secondary management CID.

It will be appreciated by the skilled person that while the embodiment described relates to WiMAX networks, the invention described herein could equally be applied to any suitable network.

This application is based upon and claims the benefit of priority from United Kingdom patent application No. 0716246.4, filed on Aug. 20, 2007, the disclosure of which is incorporated herein in its entirety by reference.

What is claims is:

1. A method for providing access to emergency services over a WiMAX network, comprising:

identifying when a user device sends a signal to the WiMAX network requesting access to an emergency service, the signal containing a parameter which is related to an emergency service type and which specifies each of the emergency services;

inquiring a nearest emergency service communication device to the user device;

detecting a network address of the nearest emergency service communication device to the user device;

relaying a management message via the WiMAX network to the user device, the management message containing the network address of the nearest emergency service communication device; and establishing at least one Service Flow between the WiMAX network and the user device to allow data to be exchanged between the user device and the nearest emergency service communication device;

wherein the signal sent from the user device to the WiMAX network is sent by the use of a predetermined management connection identifier (CID) while the management message relayed via the WiMAX network to the user device is sent by the use of a management CID which is different from the predetermined management CID and which is relayed to the user device along with the network address of the nearest emergency service communication device.

2. The method of claim 1 wherein the nearest emergency service communication device is located on a second network which is linked to the WiMAX network via a gateway.

3. The method of claim 2 wherein the user device is provided a network address on a management connection.

4. The method of claim 3 wherein the network address is sent on a Secondary management connection.

5. The method of claim 2 wherein the second network is IP based.

6. The method of any claim 2 wherein the WiMAX network and the second network are connected via one or more IP networks.

7. The method of claim 1 wherein the signal which is sent from the user device to the WiMAX network is sent on a Basic connection.

8. The method of claim 1 wherein the management message which is relayed from the WiMAX network to the user device is sent on a Secondary connection.

9. The method of claim 1 wherein the signal sent by the user device to the WiMAX network is a management message containing a parameter to identify the signal as an emergency service request.

10. The method of claim 9 wherein the management message sent by the user device to the WiMAX network contains one or more parameters indicating the type of emergency service required.

11. The method of claim 9 wherein the management message sent by the user device to the WiMAX network contains one or more parameters indicating a management connection over which the management message is to be transferred.

12. The method of claim 1 wherein a Service Flow parameter included in the signal indicates whether a Service Flow context is set to be associated with the nearest emergency service communication device.

13. The method of claim 12 further comprising the steps of:
the user device detecting when the Service Flow is no longer required;
releasing a connection between the user device and the nearest emergency service communication device; and
deleting the Service Flow context.

14. The method of claim 12 further comprising:
a device on the WiMAX network detecting when the Service Flow is no longer required;
releasing a connection between the user device and the emergency service communication device; and
deleting the Service Flow context.

15. The method according to claim 1 wherein the nearest emergency service communication device is a Public Safety Answering Point (PSAP) for contacting the emergency services.

16. A method of establishing an emergency service call over a WiMAX network when a user device is not authorized to access the WiMAX network, the method comprising:
identifying when a user device requests access to an emergency service communication device, the user device requesting the access by sending a signal containing a parameter which is related to an emergency service type and which specifies emergency services;
checking that a category of call is allowed by the WiMAX network;
inquiring a nearest emergency service communication device to the user device;
detecting a network address of the nearest emergency service communication device;
relaying a signal via the WiMAX network to the user device, the signal containing the network address of the nearest emergency service communication device; and
establishing at least one Service Flow between the WiMAX network and the user device to allow data to be exchanged between the user device and the nearest emergency service communication device over the WiMAX network,
wherein the signal sent from the user device is sent by the use of a predetermined management connection identifier (CID) while the signal relayed via the WiMAX network to the user device is sent by the use of a management CID which is different from the predetermined management CID and which is relayed to the user device along with the network address of the nearest emergency service communication device.

17. A system for providing access to emergency services over a WiMAX network, the system comprising:
a user device,
a second network connected to the WiMAX network via a gateway and having a plurality of emergency service communication devices located on the WiMAX network, and
a Service Module;
the Service Module being a logical component arranged to detect a network address of a nearest emergency service communication device to the user device,
wherein the user device is provided with the network address by a management message containing said network address,
wherein the user device is configured to send a signal by the use of a predetermined management connection identifier (CID) to the WiMAX network, the signal requesting access to one of the emergency services, while the Service Module is configured to relay the management message to the user device by the use of a management CID which is different from the predetermined management CID and which is relayed to the user device along with the network address of the nearest emergency service communication device.

18. An emergency service module located within a predetermined network, the emergency service module comprising:
a portion which detects an emergency service communication device which is nearest to a user device requesting access to the emergency service; and
a portion which detects a network address of the emergency service communication device to transmit the network address to a base station,
wherein the emergency service module is configured to detect the emergency service communication device in response to receiving a signal sent from the user device by the use of a predetermined management connection identifier (CID), the signal requesting access to the emergency service, and is further configured to relay a message to the user device containing the network address of the emergency service communication device, the message being sent by the use of a management CID which is different from the predetermined management CID and which is relayed to the user device along with the network address of the nearest emergency service communication device.

* * * * *

UNITED STATES PATENT AND TRADEMARK OFFICE
CERTIFICATE OF CORRECTION

| | | |
|---|---|---|
| PATENT NO. | : 9,019,867 B2 | Page 1 of 1 |
| APPLICATION NO. | : 13/567374 | |
| DATED | : April 28, 2015 | |
| INVENTOR(S) | : Prince Arora | |

It is certified that error appears in the above-identified patent and that said Letters Patent is hereby corrected as shown below:

In the Specification

Column 1, Line 9: Delete "0716426.1" and insert -- 0716246.4 --

Signed and Sealed this
Seventeenth Day of November, 2015

Michelle K. Lee
*Director of the United States Patent and Trademark Office*